Sargent & Towne,
Globe Valve,

Nº 48,452. Patented June 27, 1865.

Witnesses.

Inventor.
J. B. Sargent and F. W. Towne
by their attorney.

UNITED STATES PATENT OFFICE.

JAMES B. SARGENT AND FRANS. W. TOWNE, OF FITCHBURG, MASS.

IMPROVEMENT IN STEAM-COCKS.

Specification forming part of Letters Patent No. 48,452, dated June 27, 1865.

*To all whom it may concern:*

Be it known that we, JAMES B. SARGENT and FRANCIS W. TOWNE, of Fitchburg, in the county of Worcester and State of Massachusetts, have invented an Improved Steam-Cock; and we do hereby declare the same to be fully described in the following specification and represented in the accompanying drawings, of which—

Figure 1:
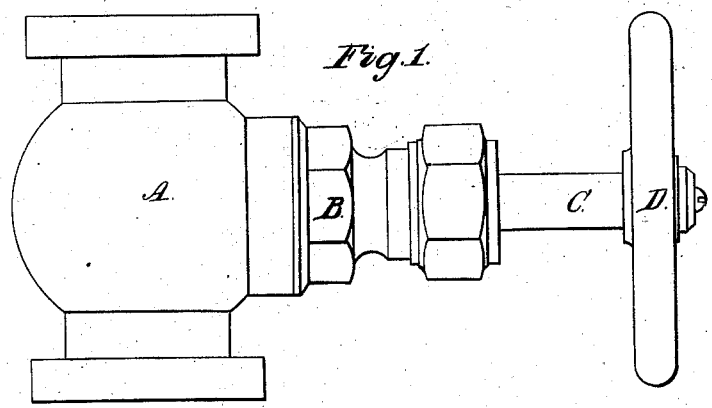
Figure 2:
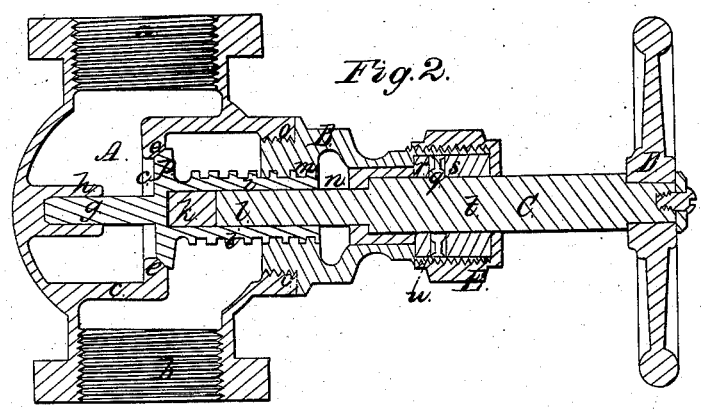

Figure 1 is an elevation, and Fig. 2 a vertical and longitudinal section, of it.

Much difficulty has been experienced in preventing the leakage around the valve-stem of a common steam-cock, especially when the stem, in order to move the valve, has a longitudinal as well as a rotary motion imparted to it.

In carrying out our invention we employ to operate the valve-stem a key, which, when in action, has a rotary motion only, and we provide such key with a flange or collar and two annuli of wood to surround the shank of the key and be placed in a box or case adapted to receive them. We also combine with the valve, its stem, and its case an auxiliary guide and guide-socket, the whole being as hereinafter described. The collar and wooden annuli, besides serving to maintain the shank in place, operate to prevent the escape of steam around the shank. The auxiliary guide and socket co-operate with the valve-stem and its female screw in imparting to the valve a true rectilinear movement and in properly directing it upon its seat.

In the drawings, A denotes the case of the cock, it being furnished with a valve-seat partition, $c$, extending across it in manner as shown in Fig. 2. This partition has a conical valve-seat, $e$, made within it to receive a corresponding valve, $b$, whose stem $i$ has a male screw cut on its outer surface and adapted to a female screw, $m$, formed in a cap, B, which screws into the case, as shown at $o$ $o$. The stem $i$ also has a socket, $k$, made in it axially, and polygonal or square in cross-section, and adapted to receive the corresponding head $l$ of a key, C.

A hand-wheel, D, is applied to the upper end of the shank $t$ of the key C. Furthermore, the said shank has a collar or flange, $q$, encircling it and fixed to and projecting from it. This collar or flange is arranged in a cylindrical chamber, $u$, formed in the upper part of the cap B, and furnished with a cap-screw, E, which is screwed on the head of the part B. There are also placed within the said chamber two annuli or rings, $r$ $s$, which encompass the shank $t$. One of these rings is above and the other below the flange $q$, and they are so made that when the cap E is screwed down it shall bear upon the upper ring, $s$, and force it down on the flange and the latter on the lower ring, which is to rest on the bottom of the chamber. These packing-rings we prefer to make of wood, because by means of the cap E, screwed on the screw $q$, the rings so made can be compressed sufficiently to produce a steam-tight joint around the stem $t$, and besides this they serve to hold the key in its proper position and resist wear for a great length of time.

The cap B has a chamber, $n$, formed in it to receive the valve-stem during the raising of the valve off its seat.

From the bottom of the valve a cylindrical guide, $g$, projects and extends into a corresponding socket formed in a projection, $h$, raised on the bottom of the valve-case A, the said case being provided with coupling-screws $a$ $b$, and the whole being as shown in Fig. 2. On turning the key C the valve-stem $i$ will be put in revolution, so as to cause the screw thereof to elevate the valve from its seat. A contrary movement of the key will cause the valve to be moved toward and closed on its seat.

We would remark that we are aware that it is not new in faucets to have the valve slide vertically without any rotary motion, and to be lifted by a screw having a rotary but no longitudinal motion. Therefore we do not claim such, for with our improvement the valve can turn and fit itself to its seat, as either may become worn from time to time, and this is an important advantage. Therefore

What we claim as our invention is—

1. An improved steam-cock made as described—viz., not only with the lifting-screws arranged with or applied to the stem of the